United States Patent
Lalley et al.

(10) Patent No.: US 8,860,783 B2
(45) Date of Patent: Oct. 14, 2014

(54) QUASI-THREE-DIMENSIONAL DISPLAY APPARATUS

(76) Inventors: Marc Lalley, Franklin, NH (US);
Matthew Lalley, Franklin, NH (US)

( * ) Notice: Subject to any disclaimer, the term of this patent is extended or adjusted under 35 U.S.C. 154(b) by 337 days.

(21) Appl. No.: 13/094,898

(22) Filed: Apr. 27, 2011

(65) Prior Publication Data

US 2012/0274640 A1    Nov. 1, 2012

(51) Int. Cl.
*G06T 15/50*    (2011.01)
*G02B 27/22*    (2006.01)

(52) U.S. Cl.
CPC .................................. *G02B 27/2221* (2013.01)
USPC ............................................. 348/42; 345/426

(58) Field of Classification Search
CPC ....................................................... G06T 15/50
USPC ....................................................... 348/42–60
See application file for complete search history.

(56) References Cited

U.S. PATENT DOCUMENTS

| | | | |
|---|---|---|---|
| 6,952,266 B2 | 10/2005 | Abbink | |
| 7,224,526 B2 | 5/2007 | Putilin et al. | |
| 7,697,208 B2 | 4/2010 | De Zwart et al. | |
| 8,026,986 B2 * | 9/2011 | Izawa et al. | 349/8 |
| 8,066,378 B2 * | 11/2011 | Lalley et al. | 353/10 |
| 8,066,379 B2 * | 11/2011 | Lalley et al. | 353/10 |
| 8,118,674 B2 | 2/2012 | Burak et al. | |
| 2002/0117775 A1 * | 8/2002 | Tarabula | 264/219 |
| 2003/0112237 A1 * | 6/2003 | Corbetta | 345/426 |
| 2008/0084542 A1 * | 4/2008 | Lalley et al. | 353/10 |
| 2009/0027622 A1 * | 1/2009 | Lalley et al. | 353/28 |
| 2010/0073585 A1 * | 3/2010 | Izawa et al. | 349/8 |
| 2011/0164036 A1 * | 7/2011 | De Zwart et al. | 345/419 |
| 2011/0250092 A1 * | 10/2011 | Foster et al. | 422/73 |
| 2012/0008103 A1 * | 1/2012 | Lalley et al. | 353/69 |
| 2012/0139903 A1 * | 6/2012 | Rush et al. | 345/419 |
| 2012/0274640 A1 * | 11/2012 | Lalley et al. | 345/426 |

* cited by examiner

*Primary Examiner* — Dave Czekaj
*Assistant Examiner* — Kehinde O Abimbola
(74) *Attorney, Agent, or Firm* — Intrinsic Law Corp.; Ibrahim M. Hallaj

(57) ABSTRACT

A system for showing scenes that benefit from three-dimensional or quasi-three-dimensional display. In some embodiments, a generally-spherical section of a refracting material is provided in a light diverging layer of finite thickness that can be placed over a substrate display device (such as a LCD or similar flat monitor or display screen) and the refracting element and light diverging layer then spread at least a portion of the scene outwardly from the system in a three-dimensional or quasi-three-dimensional manner. The result is a more accurate, entertaining, interesting, and realistic depiction of scenes having three-dimensional features (e.g., globes, spheres, planets, other objects) shown by the display. The images may be static or animated.

11 Claims, 5 Drawing Sheets

QUASI-THREE-DIMENSIONAL DISPLAY APPARATUS

TECHNICAL FIELD

The present invention relates to display systems and methods for using the same. More specifically, it relates to displays that include a refracting feature acting as a lens to spread an image or portion of an image so as to present a three-dimensional or quasi-three-dimensional viewable representation of a scene or object being displayed.

BACKGROUND

Humans generally find it useful or entertaining to view images or projections of visual representations of real or imaginary things. Therefore, we have developed technologies to enable us to place visual representations, such as still images and moving images, onto surfaces or screens so that we can enjoy or benefit from such visual displays. The content of such information represented on display screens is typically generated by a computer or by a recording and broadcast of the recording.

Screens and displays in common use include television (TV) screens and computer monitors (collectively "displays"). These types of displays have evolved with technological advancements. Early types were illuminated by electron beams from electron guns, the beams sweeping charged particles across a generally-rectangular display screen that was coated with a phosphorescent material. The material would then glow or emit visible light corresponding to the image caused by the electron source and magnetic fields in the orthogonal dimensions of the display screen. The result was a visible intensity map (black and white) viewable image. Further advancements brought color displays, which themselves evolved in time to include cathode ray tubes (CRTs), liquid crystal displays (LCD), plasma displays, light emitting diode (LED) displays, and others.

These displays are generally two-dimensional as far as their viewable surface design. That is, present displays of this type are basically flat or almost flat. Accordingly, persons viewing these displays see substantially the same view of the object being displayed no matter where the viewers are situated with respect to the two-dimensional displays. This makes viewing such displays equivalent to viewing a flat two-dimensional photo, painting, or similar object, with the addition of dynamic imagery (video) in some cases. Therefore, even when depicting what is in reality a three-dimensional object (e.g., a soccer ball or a planet) these displays flatten the three-dimensional object completely for presentation on the two-dimensional displays. Most of us have come to accept this as normal, but it is an abstraction that is not natural. The fact that some displays have a gentle curvature to their face does not cure this simplification or abstraction.

It is therefore interesting and/or useful to consider alternative displays that provide either a more natural sensation of viewing a two- or three-dimensional scene.

SUMMARY

Various embodiments of the present invention are directed to a display system comprising a substrate display device that generates a scene comprising visible light, said substrate display having a front face from which said visible light emanates; a light diverging layer disposed over said substrate display device, said light diverging layer having a back face placed in proximity to said substrate display and a front face directed outwardly at a viewer of said system so that said visible light substantially travels out of the front face of said substrate display device, into the back face of the light diverging layer then out the front face of the light diverging layer; said light diverging layer having at least one refracting portion thereof, which refracts a portion of said visible light outwardly from a normal direction so that the refracted portion of visible light spreads out to give a three-dimensional view of a scene incident onto the back face of said refracting portion of said light diverging layer.

Other embodiments are directed to a method for projecting a three-dimensional likeness of a scene from a substantially two-dimensional display apparatus, comprising forming a refracting element in a light diverging layer disposed over a face of said substantially two-dimensional display apparatus; delivering a visible light image to said substantially two-dimensional apparatus; passing visible light of said image from said substantially two-dimensional apparatus into said light diverging layer and into the refracting element of said light diverging layer; refracting a portion of the visible light of said image using said refracting element so that the refracted portion of said visible light is spread outward for a normal to a face of said light diverging layer to give a three-dimensional view of said scene.

DETAILED DESCRIPTION

As mentioned above, present display systems are limited in their ability to produce images of three-dimensional scenes, and have generally left us with mere two-dimensional representations of these scenes, akin to moving flat photographs on screen. It is described below how to make and operate an interesting and useful new type of display having features that mimic or give a good presentation of three-dimensional scenes and subjects. In some examples these displays are modified from substantially two-dimensional displays. In some examples these displays have a central three-dimensional extension that allows presentation of a three-dimensional scene to a viewer or viewers of the display in a way that more faithfully represents the three-dimensional scene or subject.

The present systems are primarily intended to produce visible intelligible images representing real or abstract objects. The images may be of colored or monochromatic nature. Colored light produces corresponding color images with respective characteristic wavelength content. Light wavelengths are representative of oscillations in the electromagnetic energy which is known to run a range of wavelengths in "the electromagnetic spectrum." Light of different colors generally includes characteristic wavelengths corresponding to the different colors, with violet and blue colors having shorter wavelengths (and higher electromagnetic field oscillation frequencies) than orange and red colors, which have longer characteristic wavelengths (and lower electromagnetic field oscillation frequencies). In that regard, the present system includes the ability to produce and project visible light. Visible light is light having characteristic wavelengths (and combinations thereof) in the visible portion of the electromagnetic spectrum, and includes light with wavelengths between about 380 nm and 780 nm, and even between about 400 nm and 700 nm.

Figure 1:
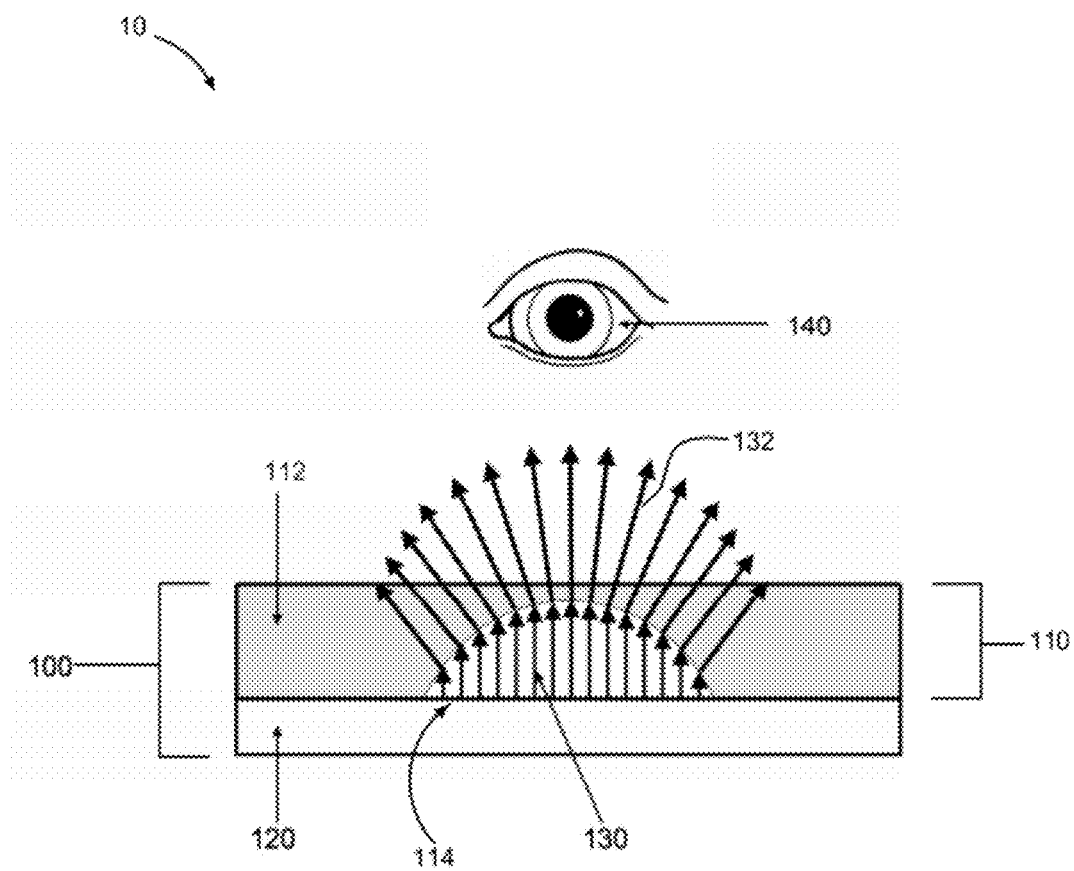
FIG. 1 illustrates an cross section of a display device according to some present embodiments.

FIG. 1 illustrates cross section of an exemplary embodiment of the present display system 10 comprising a substantially flat or flat display substrate 120 and a refracting layer 110 disposed on the substrate display 120. The refracting layer 110 and the substrate 120 may be bonded or attached or coupled to one another to form a complete display unit capable of receiving light input from the back side of the display as is known in the art of television or computer monitor technology.

In some embodiments, the display 120 may comprise a standard flat panel display 120 such as an LCD monitor (or similar LED, plasma, CRT, or other flat display device). Display 120 can be the same or similar to one used conventionally in a television or computer monitor, with or without useful filters or coatings known to those skilled in the art. The light diverging layer 110 causes beams of parallel rays 130 to diverge after refraction, and has a negative focal length. The light diverging layer 110 causes the light emanating from the flat panel display to diverge as it passes through it, creating a three-dimensional scene when a viewer 140 observes the display 100 by looking at the display 100.

In some embodiments, the light diverging layer 110 comprises at least two portions. A first refracting portion 114 is disposed in or on a second portion 112 of the layer. The first portion 114 may comprise a material with an optical index different than the second portion 112 so that light is bent or refracted by first portion 114 to spread the parallel light rays 130 outward in a diverging fashion 132. This spreading will cause the viewer 140 to see a quasi-three-dimensional image as if it emanated from a depth or depths from display system 10.

The refracting portion 110 may include in a preferred embodiment a single element (114) that is geometrically a spherical portion. That is, the refracting portion 114 comprises a volume that is substantially an outer slice of a sphere or spheroidal primitive. Note that other spherical, spheroidal or ellipsoidal volumes may be used to derive the desired shape, volume, and size of refracting portion 114. The cross section of refracting portion 114 is therefore not limited to a circular or arc section.

The refracting portion 114 may be embedded or formed within the remaining second portion 112 of light diverging layer 110, which may be of any thickness needed to support the light diverging function of this feature. In some embodiments, this light diverging layer can comprise combinations of glass, quartz, plastic, Lexan, polymers of various light refracting indices, densities, and so on. The light diverging layer 110 may be thin or thick as described above, and may be a single thickness across its width, or may be tapered or varied in thickness as a function of its location on the surface of the display 10.

In some embodiments, more than one feature like or similar to refracting portion 114 may be included in the light diverging layer 110, including a plurality of such portions 114, which may be placed in a pre-determined arrangement across the face of the display 10. The refracting portion 110 may comprise a monolithic block or structure as shown by 114 in FIG. 1, but may also have other mechanical and optical compositions. For example, a Fresnel lens arrangement may be used to reduce the thickness of the refracting portion 114.

Figure 2:
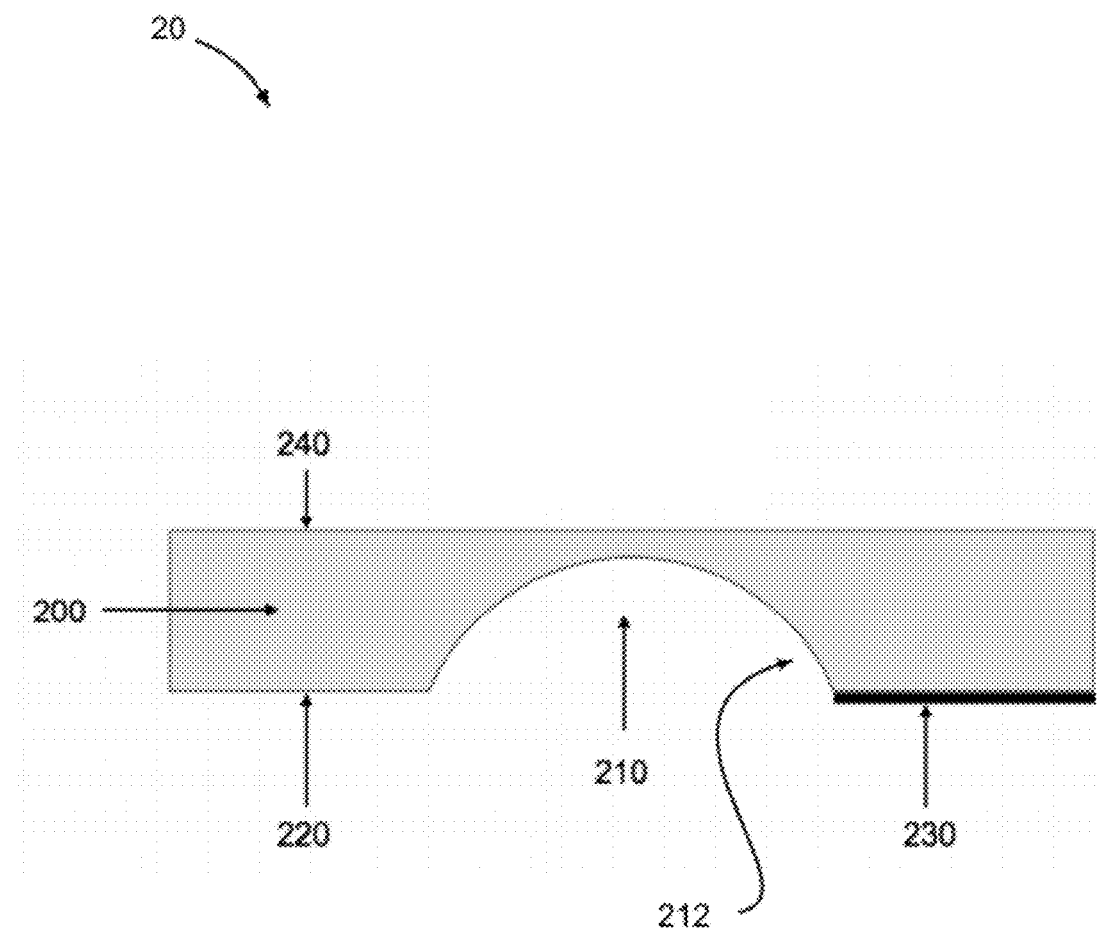
FIG. 2 illustrates an exemplary light diverging element.

FIG. 2 illustrates an exemplary diagram of a cross section of the light diverging layer component 20 with depictions of the interior and exterior composition. Light diverging layer 200 may be made of a transparent solid glass, acrylic or other optical material that is adapted to carry light beams in a useful (e.g., visible) range of the electromagnetic spectrum. A spherical section 210 is removed from the rest of the diverging layer 200. This cutout acts to diverge incoming light and "spherize" the light as it travels through the display system. Note that, as mentioned above, the cutout does not necessarily need to be spherically shaped in all embodiments, but can comprise a spheroidal profile, ellipsoidal, oval, or other shape to suit a given need.

The inner (or lower as shown in the drawing) surface of the light diverging layer has two planes, a spherical cutout 210 and a planar portion 220. The spherical cutout is rounded to match and alter the shape of an orthographic projection. Any portion of the image outside the orthographic projection and spherical cutout 210 travels through the planar surface 220 unaltered. This surface can be used to display stars or other images written by the flat panel display as background. This surface can also be selectively blocked by the use of a partial or complete light-blocking layer 230. This layer can be customized, for example, it can be made jet black, printed, a 3-D hologram, or have tiny pinholes in the surface to allow light to pass through. The use of this layer substantially enhances the contrast between the orthographic projection and the area around it, which improves the overall perception in some embodiments.

The top (or forward or front) surface 240 of display 20 can be flat or curved, beveled etc. In some embodiments, if the light diverging layer 200 is overall thinner in the center than the sides, then it acts to diverge the light traveling therethrough. Separating the diverging layer and the flat panel display layer may in some embodiments increase its resolution. As the light diverging layer is moved away from the flat panel substrate display (e.g., LCD display), the image appears smaller without any loss of information; therefore the effective or apparent resolution increases. It is possible to create an ultra high definition display that makes discerning individual image pixels impossible with the human eye.

Figure 3:
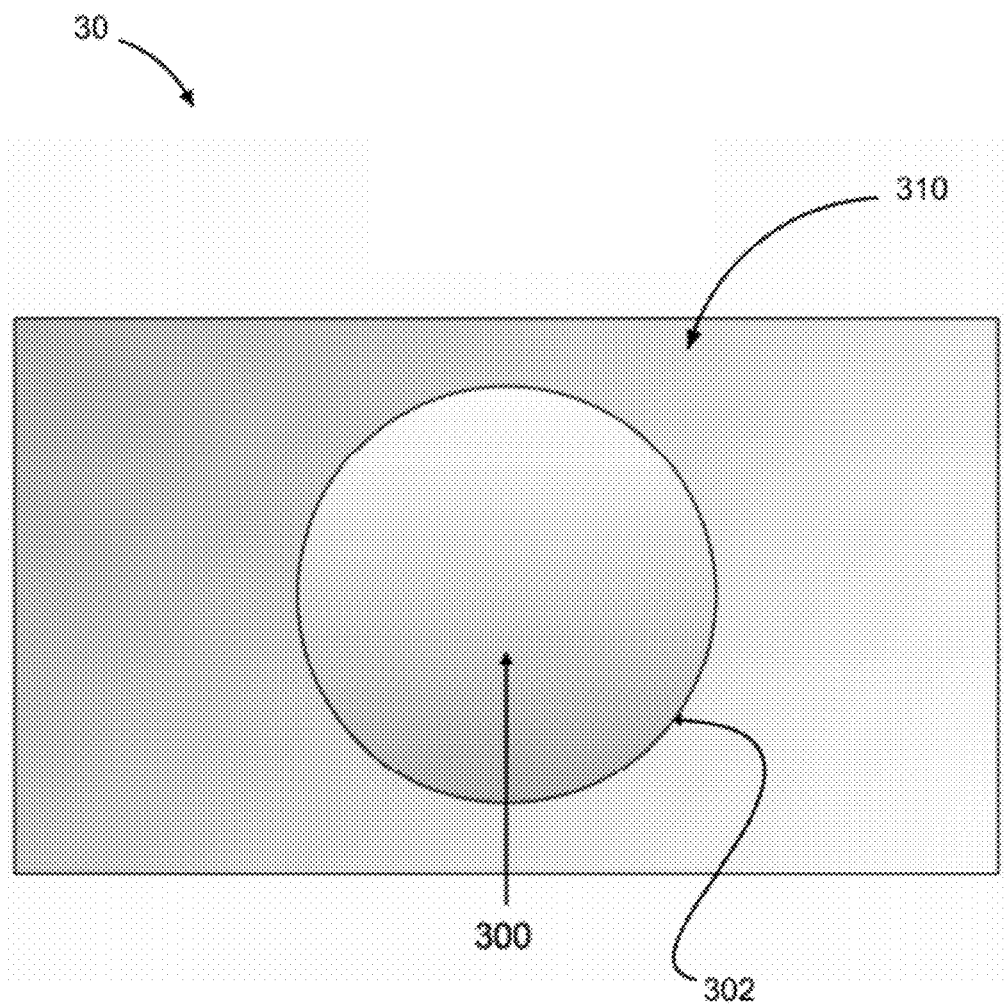
FIG. 3 illustrates a front view of an exemplary display system.

FIG. 3 illustrates an exemplary representation of a frontal or top view of the light diverging layer 30 as may be seen by a viewer of the display. A spherical cutout 300 is shown, having some shape and diameter 302 and disposed within an otherwise flat or substantially two-dimensional layer 310.

Figure 4:
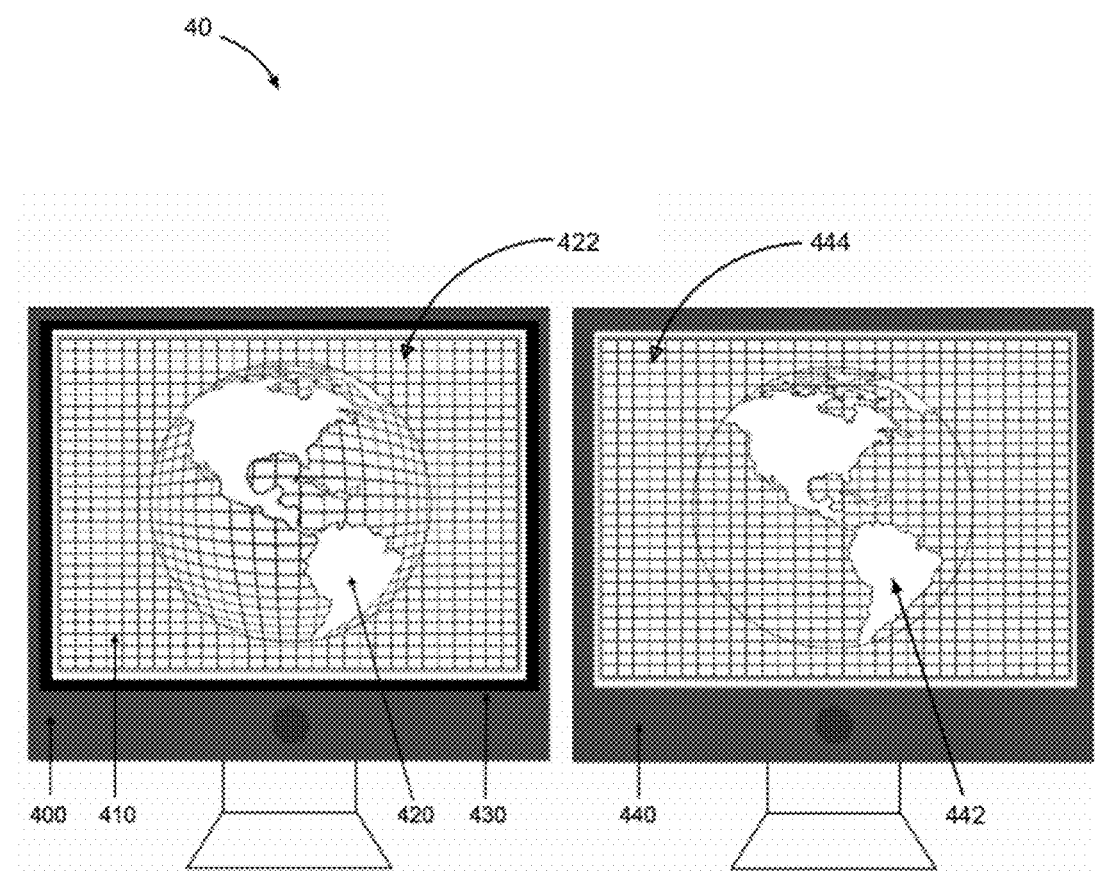
FIG. 4 illustrates aspects of some features of the present display systems.

FIG. 4 illustrates the optical or visual effect of the light diverging layer. A flat panel display 400 is shown at the left. In this case the flat panel display 400 is integrated into or positioned over or mated to a computer display device (e.g., as found on an Apple iMac from Apple Computer, Cupertino, Calif.). An equidistant grid 410 and orthographic projection of the planet Earth 420 is displayed on the computer screen. This is compared to an image 444 on a computer screen to the right also displaying a similar scene 442.

In the absence of a light diverging layer 430, the lines of the grid and shape of the orthographic projection appear flat. In contrast, when adding a light diverging layer 430 to an identical flat panel display 440 displaying the same grid and orthographic projection, the image appears to lift off the screen in the center of the image by bulging the center of the image outward away from the underlying substrate flat panel display, and gradually tapering down to the horizon which is largely unaffected, giving the orthographic projection the three-dimensional effect of floating in space, with much improved perspective and less distortion.

Figure 5:
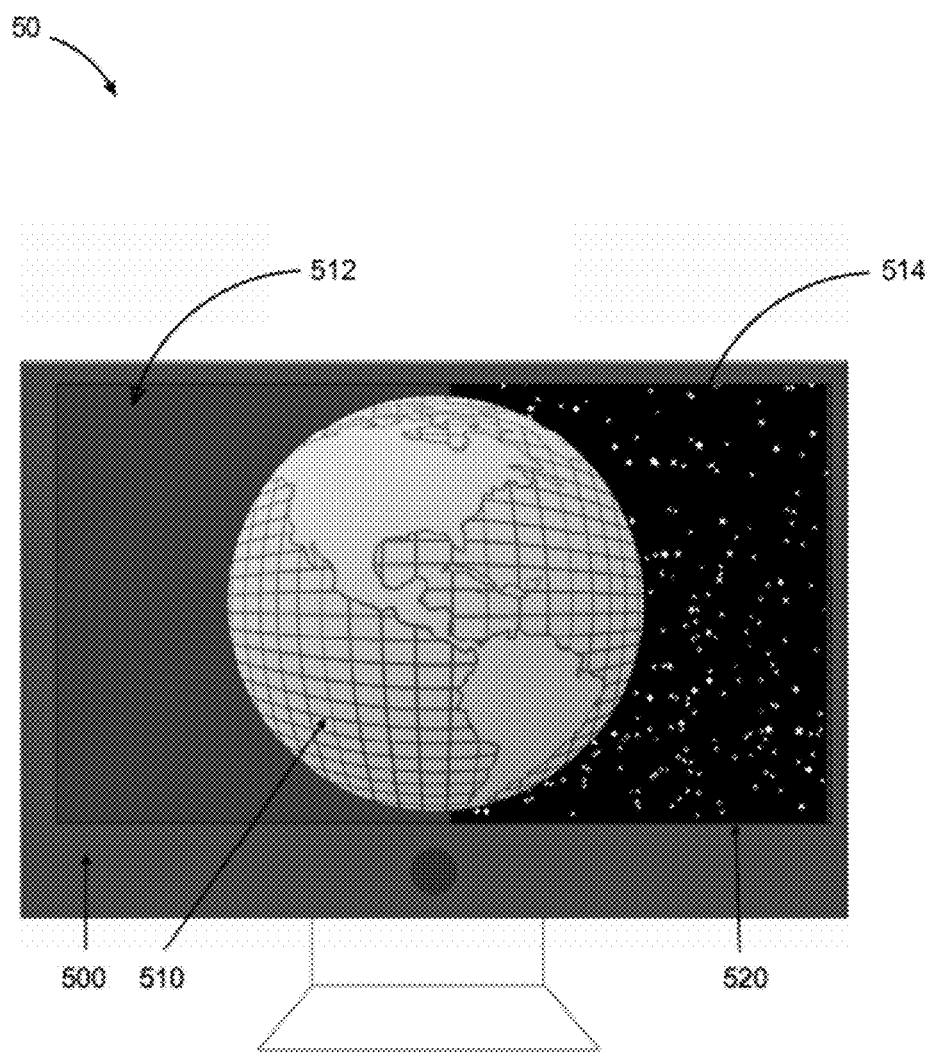
FIG. 5 illustrates another exemplary feature of the present displays.

FIG. 5 illustrates a conceptual exemplary appearance of an image of the planet Earth and other celestial objects in a scene benefitting from the present quasi-three-dimensional display 50. The scene is shown as it might appear looking at the light diverging layer 512 for use herewith. A flat panel substrate display 500 is disposed beneath a light diverging layer having a spheroidal portion 510 to spread out the rays from an image of the Earth as described above. A background image of the stars 520 is optionally applied by way of selective blocking mask, pinhole apertures in a screen between the light diverging layer and the substrate display, or some other method.

As discussed above, it can be useful to view an orthographic representation of spherical objects through a light diverging layer so that it displays a more realistic visual image of the object that is either static or moving. So for example, the representation of Earth in FIG. 5 may be a video representation where the Earth is animated so it rotates about its axis during viewing of the scene. Obviously, other scenery of other objects may be displayed by the present systems as well. It can be appreciated that physically moving about the display system 50 (e.g., sitting somewhat to the left of screen 500, then getting up and sitting somewhat to the right of screen 500) can provide interesting perspectives on the diverged quasi-three-dimensional scenery when compared to ordinary two-dimensional (flat) displays. Present flat panel displays alone are not able to effectively depict such images as three-dimensional due to distortion and other limitations.

The underlying substrate or flat panel display used above can be coupled to an apparatus for processing and storing still or live images, either remotely or incorporated as one integral unit, or the images may be downloaded from another storage source or an image sensor such as a still or animated camera. The images may further be transmitted from a source to a destination over a network such as a LAN or a WAN or the Internet itself. So in the end, a viewer of display 50 can see a real-time image of Earth as seen from a satellite or other system of cameras or real or simulated data.

The systems described and herein do not suffer from the problems associated with conventional orthographic image projection in part because they employ light diverging layer that diverges the image on the flat panel display. In some embodiments, a processor pre-processes images or image data that is being displayed on the screens described above so that, if appropriate, the scenes are distorted in a way that compensates for optical distortion by the diverging layer and appears correct to a viewer.

Conventional flat display panels displaying orthographic projections are used for perspective views of hemispheres or partial spheres or spheroidal objects. Area and shape are distorted. Distances are true along the equator and other parallels. By contrast, by including a light diverging layer, area and shape distortions are substantially reduced by optically distorting the image in a complementary way. Thereby adding a three dimensional effect with enhanced depth and perspective. The light diverging layer produces certain levels of barrel distortion where image magnification decreases with distance from the optical axis. The apparent effect is that of an image which has been mapped around a sphere or other three-dimensional shape. The light diverging layer is also capable of providing higher effective resolution image than the conventional flat panel display alone at the same viewing distance.

While it is preferred to view images through a light diverging layer, it is possible to view an erect image with high amounts of complementary barrel distortion through a light converging layer. One potential drawback to this is that one is limited in the distance and angle that an erect image can be observed. By observing from a distance which is greater than the focal length of the light converging layer, the image becomes inverted and can introduce the unwanted pincushion effect, which is the opposite of the complementary barrel distortion. In certain instances it may be beneficial to utilize a light converging layer if the audience is in a more controlled environment, such as a museum, by placing them right in an ideal viewing arrangement or "sweet spot".

The present disclosure is not intended to be limited by its preferred embodiments, and other embodiments are also comprehended and within its scope. For example, embodiments where the image dispersion layer is contoured or otherwise shaped for utility or novelty purposes to support a desired effect in the image.

Numerous other embodiments, modifications and extensions to the present disclosure are intended to be covered by the scope of the present inventions. This includes implementation details and features that would be apparent to those skilled in the art in the mechanical, optical, logical, or electronic implementation of the systems described herein. This also includes uses for such systems, whether for entertainment, education, commercial, military, astronomical, navigational, medical, or other purposes that the present systems are capable of being used in.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A display system comprising:
   a substrate display device that generates visible light to provide a scene, said substrate display having a front face from which said visible light emanates;
   a light diverging layer comprising a light diverging lens disposed over said substrate display device, said light diverging layer having a back face placed in proximity to said substrate display and a front face directed outwardly at a viewer of said system so that said visible light substantially travels out of the front face of said substrate display device, into the back face of the light diverging layer then out the front face of the light diverging layer;
   wherein said light diverging layer has a first portion of a first index of refraction different from a second index of refraction of said light diverging lens; and
   said light diverging layer having at least one refracting portion thereof at said light diverging lens, which refracts a portion of said visible light outwardly from a normal direction so that the refracted portion of visible light spreads out to give a three-dimensional view of a scene incident onto the back face of said refracting portion of said light diverging layer.

2. The system of claim 1, said light diverging layer comprising said refracting portion made of a light-permissive material having a first index of refraction, embedded within a slab of a light-permissive material having a second index of refraction that is different from said first index of refraction.

3. The system of claim 1, said light diverging lens comprising a curved three-dimensional section of a spherical or spheroidal geometry.

4. The system of claim 1, said substrate display comprising a flat screen display such as a LCD, plasma, or LED display screen.

5. The system of claim 1, said substrate display comprising a conventional television screen, flat panel projection screen, or computer monitor.

6. The system of claim 1, further comprising a plurality of refracting portions in said light diverging layer.

7. The system of claim 1, further comprising a processor that processes digital images representing said scene.

8. The system of claim 7, further comprising a network interface so that the processor may receive data from which said digital images derive.

9. The system of claim 1, said first portion of said light diverging layer comprises a first material and said light diverging layer comprises a second material different from said first material.

10. The system of claim 1, a portion of said back face of the light diverging layer being coated with an opaque layer so as to create a mask.

11. The system of claim 1, said light diverging lens comprising a cutout formed into said back face of said light diverging layer.

* * * * *